United States Patent [19]

Coulon

[11] 3,869,777

[45] Mar. 11, 1975

[54] COMPONENT PARTS OF WELDED ROTORS

[75] Inventor: Andre Coulon, Belfort, France

[73] Assignee: Societe Generale de Constructions Electriques et Mecaniques (ALSTHOM), Paris, France

[22] Filed: Aug. 28, 1972

[21] Appl. No.: 284,111

[30] Foreign Application Priority Data

Aug. 27, 1971  France .............................. 71.31275

[52] U.S. Cl. .................... 29/183, 416/198, 416/213
[51] Int. Cl. ................................................ B22f 5/00
[58] Field of Search ....... 416/236, 237, 198 A, 213; 29/183

[56] References Cited
UNITED STATES PATENTS

| | | | |
|---|---|---|---|
| 408,864 | 8/1889 | Vogelgesang .................... | 416/242 X |
| 1,504,710 | 8/1924 | Roberts ............................. | 416/237 |
| 1,593,516 | 7/1926 | Sutter .............................. | 416/242 X |
| 2,384,919 | 9/1945 | Huber .............................. | 416/213 |
| 2,450,493 | 10/1948 | Strub .............................. | 416/213 X |
| 2,553,078 | 5/1951 | Buck ............................... | 416/213 X |
| 2,637,521 | 5/1953 | Constantine et al. ........... | 416/213 X |
| 2,908,223 | 10/1959 | Buchl ............................. | 416/213 X |
| 2,928,649 | 3/1960 | Lombard et al. ................ | 416/198 A |
| 2,937,806 | 5/1960 | Clarke ............................ | 416/213 |
| 2,958,469 | 5/1952 | Korshenewsky ................ | 416/236 X |
| 3,051,437 | 8/1962 | Morley et al. .................. | 416/198 A |
| 3,059,834 | 10/1962 | Hausammann ................. | 416/237 |
| 3,067,490 | 12/1962 | Luthy et al. ................... | 416/198 A X |
| 3,159,379 | 12/1964 | Auger ............................. | 416/198 A X |
| 3,166,129 | 1/1965 | Bryan ............................. | 416/236 X |
| 3,432,884 | 3/1969 | Lysakowski et al. ........... | 416/237 X |
| 3,608,976 | 9/1971 | Zugelder ........................ | 416/236 X |
| 3,688,371 | 9/1972 | Koff ............................... | 416/198 A X |

*Primary Examiner*—L. Dewayne Rutledge
*Assistant Examiner*—O. F. Crutchfield
*Attorney, Agent, or Firm*—Craig & Antonelli

[57] ABSTRACT

A component part of a welded rotor formed of axially disposed rings or discs each having an axial extension of annular shape providing a lateral face which is to be welded to the lateral face of the extension on the adjacent ring or disc, the extension being provided with an annular groove disposed in the radially external portion thereof and an annular boss or fillet within the central opening of the extension so as to reduce the stresses of a mechanical or thermal origin in the welded zones and to free these zones from the influence of centrifugal strains.

8 Claims, 4 Drawing Figures

COMPONENT PARTS OF WELDED ROTORS

The construction of rotors, for example, for turbines, from welded parts has advantages of a mechanical and thermal nature, and also of a technological nature. This type of construction involves forged parts whose dimensions are smaller than those of one-piece rotors, and which are easier to produce and can be more readily and accurately checked, and in which the uniform quality of the metal is better guaranteed. The various machining operations, since they take place on small parts, are simpler and tolerances are easier to maintain.

The component parts of a rotor are formed from discs or rings having an axial extension of annular shape whose outer diameter is less than that of the disc or ring with which it is associated, and against the axial face of which is welded the axial face of the extension of an adjacent disc or ring.

The present invention has for an object to reduce stresses of a mechanical or thermal origin in the welded zones and, in a preferred embodiment, to free these zones completely from the influence of centrifugal strains inherent in the discs or rings. To this end, the invention provides for the annular extension to be connected to its associated disc or ring between an annular groove disposed in the radially external portion of the extension and an annular boss or fillet disposed on the extension in the central opening in the latter.

The annular boss or fillet enables the radial thickness at the junction to be maintained at least equal to the radial thickness of the welded face, and the annular groove at least partly frees the weld zone from the effects of centrifugal strains exerted on the disc or ring, at the same time as it restricts axial thermal flow.

As to the question of shaft rigidity, it has been found that the depth of the annular groove should be smaller than, or at most equal to, half the radial thickness of the welded face.

It is of advantage to free the welded zone completely from the influence of the centrifugal strains inherent in the discs or rings. To this end, the invention provides for the depth of the annular groove to be at least equal to the difference between the radial thickness of the welded face and the axial thickness of the extension. The axial thickness of the extension is determined by the size of the welding apparatus which has to be inserted between two adjacent discs or rings. However, in a case where the axial thickness so determined would lead, upon application of the aforementioned preferred rule relating to depth, to an annular groove depth greater than half the radial thickness of the welded face, a greater axial thickness may be adopted than that demanded by welding requirements alone.

The radial thickness of the welded face is a function of the desired rigidity of the shaft, of the fatigue rate permitted for the alternating bending stress, during rotation, and of the torque to be transmitted.

In order that the present invention may be more readily understood, reference will now be made to the accompanying schematic drawings which illustrate one embodiment of the invention and in which.

Figure 1B:
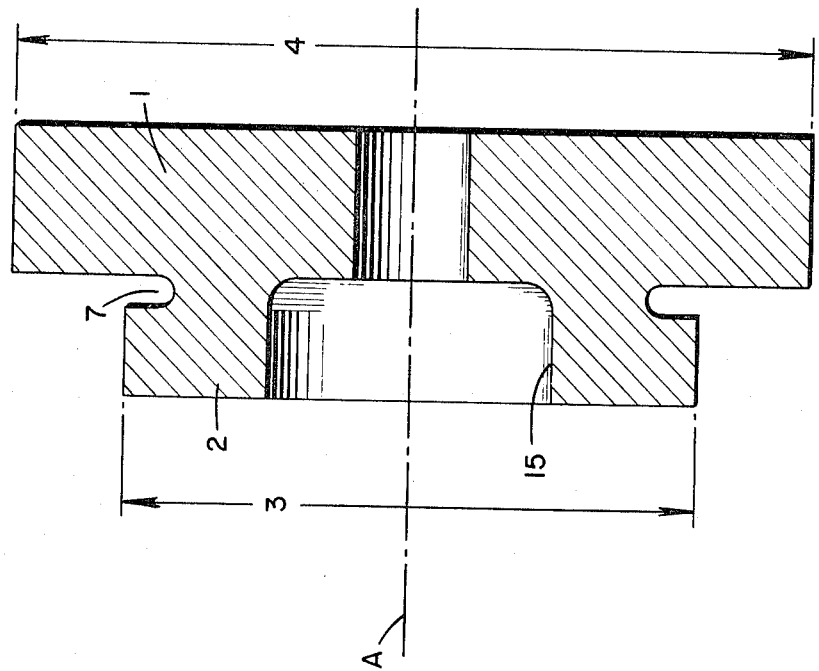
FIGS. 1A and 1B are top plan and end views, respectively, of a component part of a turbine rotor.
Figure 1A:
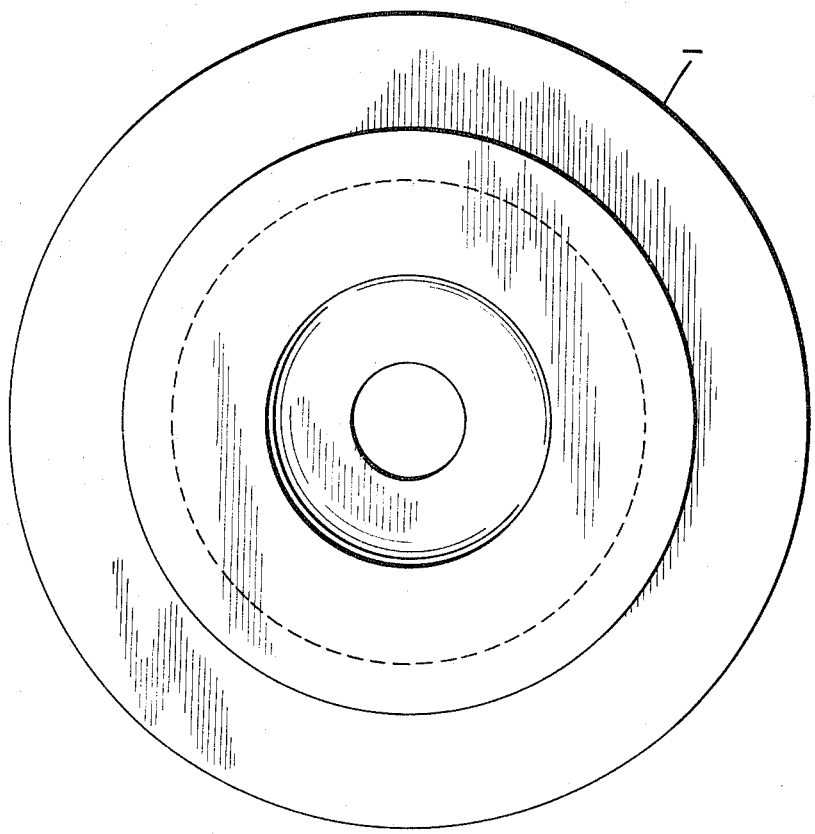

The part shown FIGS. 1A and 1B comprises a disc 1, having a central axis A to which discs are attached blades (not shown), and an annular extension 2 coaxial with the disc 1 and whose outer diameter 3 is less than the outer diameter 4 of the disc 1. If desired the disc 1 may have the shape of a disc of uniform strength instead of having a constant axial thickness, as shown.

Figure 2A:
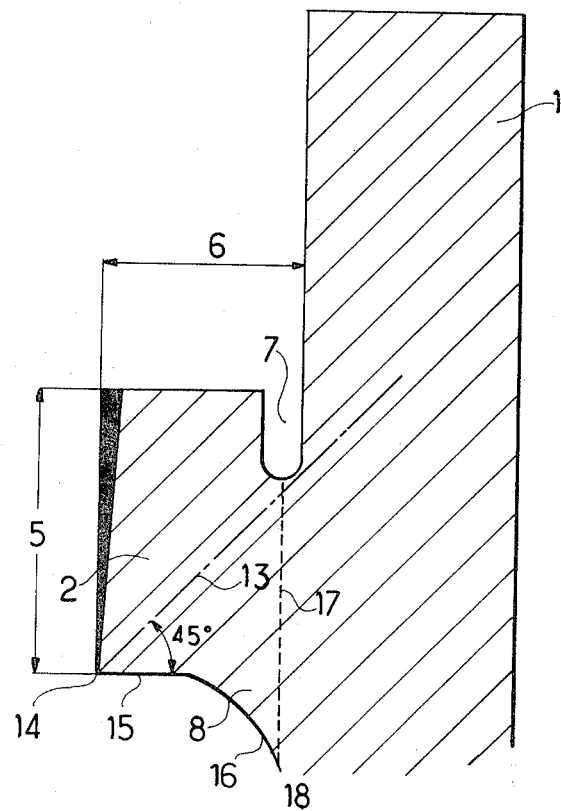
FIG. 2A is a partial section of the component part in large scale.

As seen in FIG. 2A, the extension 2 has, in the welded zone, a radial thickness 5 determined by the torque to be transmitted, by the centrifugal stresses due to the inherent mass of the extension, and by the alternating bending stresses upon rotation. The axial thickness 6 is sufficient to permit the insertion of a welding apparatus between two adjacent discs 1.

The extension 2 is connected to the disc 1 in a zone which is off-set radially towards the center of the rotor, by means of an annular groove 7 disposed in the radially external portion of the extension and an annular fillet 8 added to the radially internal portion of the extension defining the central opening 15.

Figure 2B:
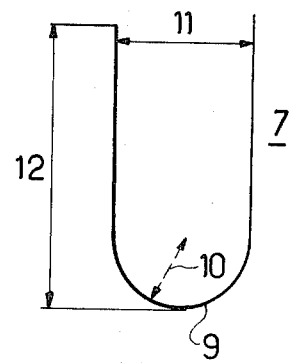
FIG. 2B is an enlarged outline view of the section of the annular groove in this part.

The bottom of the groove 7 comprises a rounded portion 9 whose radius 10 is equal to half the axial width of the groove, as seen in FIG. 2B. The width is at least equal to half the height 12 of the groove which is, itself, selected so that the groove 7 is tangent to a straight line 13 drawn from the base 14 of the weld at an inclination of 45° to the axis of the rotor. These dimensions for the groove 7, predetermined in accordance with the conditions generally encountered with turbine rotors for compressible fluids and considered as optimal, but it is at least desirable that the groove 7 be tangent or secant to the straight line 13 so as to reduce to the greatest possible extent stresses of mechanical origin in the welded zone. This no longer applies if the radial thickness 5 is less than the axial thickness 6; nevertheless, a groove 7 is used and retains its usefulness for limiting the axial dissipation of heat.

Thus formed, the extension 2 is subject to no centrifugal stresses other than those due to its inherent mass and, during rotation, to its alternating bending stress.

The extension 2 has a uniform inner diameter for opening 15 for about half its axial thickness 6, and a junction radius 16 then defines the annular fillet 8 so that the radial thickness 17 between the bottom of the groove 7 and the radius 16 is at least equal to the radial thickness 5.

As has proposed in copending application Ser. No. 283,032 filed Aug. 23, 1972, it is also possible to provide in the area of the base 14 an annular bead (not shown) of trapezoidal section, with sides inclined at 45°, which projects radially inwards to reduce the effect of possible welding gaps in this area.

What is claimed is:

1. A component part of a welded rotor for turbines, or the like, comprising a ring or disc having a central axis and an axial extension of annular shape extending coaxially from one face thereof, which extension has an outside diameter smaller than that of said disc or ring and the outer annular surface of which is to be welded against the outer annular surface of a corresponding extension of an adjacent disc or ring, said extension having at the portion thereof connected to said disc or ring an annular groove disposed in the radially external portion of the extension and an annular fillet on the extension within the central opening thereof.

2. A component part as claimed in claim 1 wherein the depth of the annular groove is less than or at most equal to half the radial thickness of said extension.

3. A component part as claimed in claim 1 wherein the depth of the annular groove is at least equal to the difference between the radial thickness of said extension and the axial thickness of said extension.

4. A component part as claimed in claim 1 wherein the bottom of said annular groove is rounded so as to have a radius approximately equal to half the axial width of the groove.

5. A component part as defined in claim 4 wherein the width of the annular groove is at least equal to half the depth of the groove.

6. A component part as claimed in claim 5 wherein the depth of the annular groove is less than or at most equal to half the radial thickness of said extension.

7. A component part as defined in claim 5 wherein said extension has a generally rectangular axial cross section with one long side thereof defining said outer annular surface.

8. A component part as claimed in claim 7 wherein the depth of the annular groove is at least equal to the difference between the radial thickness of said extension and the axial thickness of said extension.

* * * * *